A. H. HAKES.
THAWING POINT.
APPLICATION FILED APR. 29, 1908.
910,375.
Patented Jan. 19, 1909.
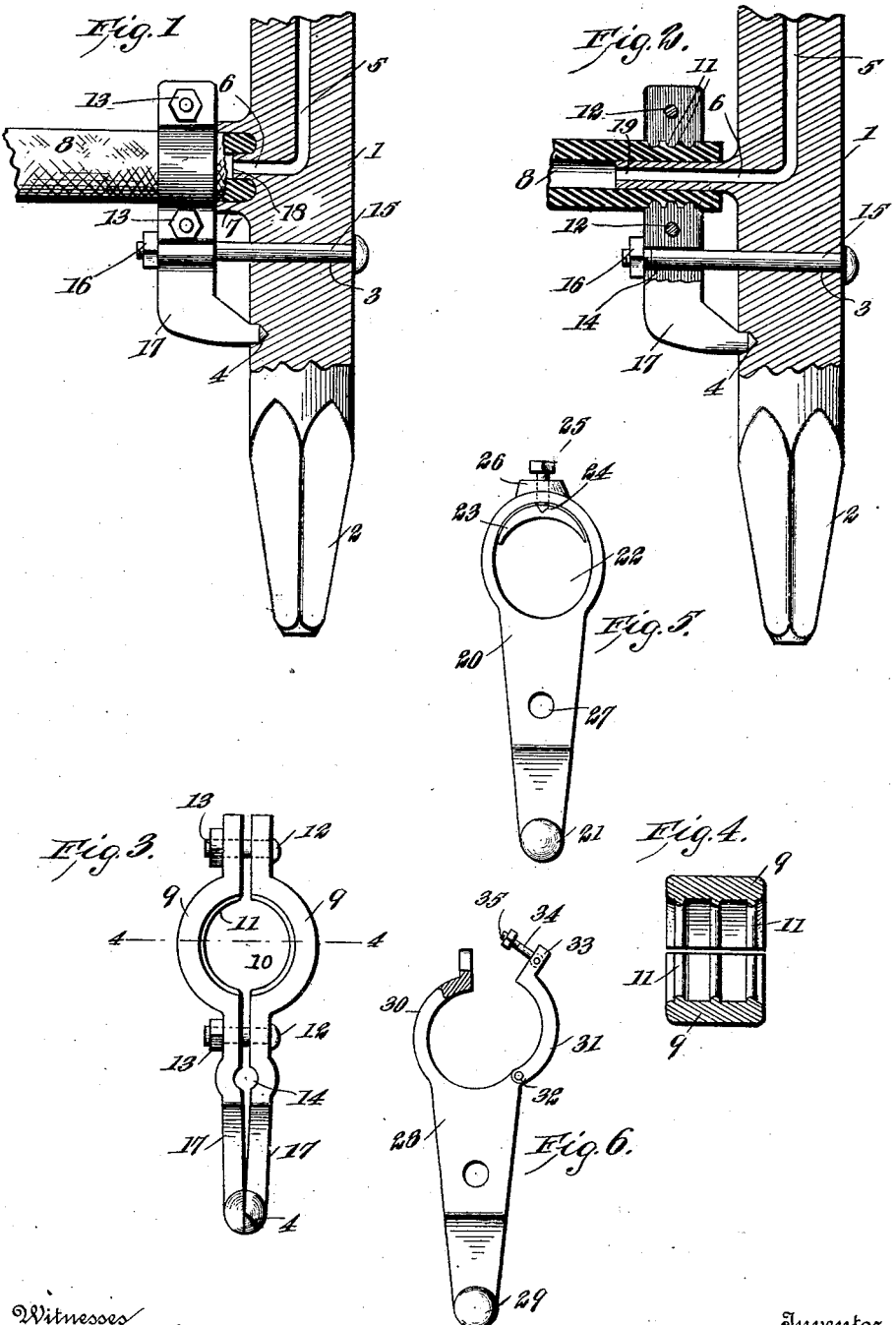
Witnesses
E. W. Callaghan
C. E. Trainor
Inventor
ALLEN H. HAKES
By Attorneys Munn & Co.

UNITED STATES PATENT OFFICE.

ALLEN HAMILTON HAKES, OF FAIRBANKS, DISTRICT OF ALASKA.

THAWING-POINT.

No. 910,375.     Specification of Letters Patent.     Patented Jan. 19, 1909.

Application filed April 29, 1908. Serial No. 429,837.

*To all whom it may concern:*

Be it known that I, ALLEN HAMILTON HAKES, a citizen of the United States, and a resident of Fairbanks, District of Alaska, have invented certain new and useful Improvements in Thawing-Points, of which the following is a specification.

My invention is an improvement in thawing points, and consists in certain novel constructions and combinations of parts as will be hereinafter described and claimed.

Referring to the drawings forming a part hereof Figure 1 is a central longitudinal section through a portion of a thawing point provided with my improvement. Fig. 2 is a similar view showing a modified form of thawing point. Fig. 3 is a plan view of the improvement, Fig. 4 is a section on the line 4—4 of Fig. 3. Fig. 5 is a plan view of a modified form of clamp, and Fig. 6 is a similar view of another modified form.

In the present embodiment of my invention, the thawing point 1 is provided near its head 2 with a transverse opening 3, and with a depression 4 adjacent to the opening. The tubular opening 5 which leads from the point of the thawing point and opens at the side thereof, as at 6, is encircled by an annular flange 7 forming a socket in which is received the end of the hose 8. The hose clamp and holder consists of a pair of jaws 9, each of the jaws being provided with a recess 10 having its inner face corrugated as at 11, and coöperating with the recess of the other jaw to form a holder in which is received the hose 8. A transverse opening is arranged on each side of the recess 10, and bolts 12 traverse the registering openings and are secured in place by nuts 13 whereby the jaws may be adjusted toward and from each other to clamp the hose therein. Each of the jaws is also provided with a second recess 14, the recesses coöperating to form a bearing through which passes a bolt 15, the bolt also passing through the transverse opening 3 and being secured in place by a nut 16. The ends of the clamping jaws remote from the holder in which is received the hose, are bent at an angle to the body portion of the jaws, as at 17, and the tips of said ends are rounded off to enter the depression 4, before mentioned.

It will be evident from the description, that the angular ends 17 of the jaws form a fulcrum upon which the jaws may be rocked when the nut 16 is turned on the bolt 15, to bring the hose into or out of the socket formed by the annular flange 7.

It will be noticed that the opening 6 is encircled by a flange 18, and that the space between the flange 18 and the flange 7 is rounded so that the edge of the hose is compressed to form a steam-tight joint when forced into the socket.

In the point shown in Fig. 2, a tube 19 is arranged on the side of the point, with which the side opening 6 registers and the tube 19 is received in the hose 8 as clearly shown in said figure.

In the operation of the improvement, the nut 16 is loosened, as are also the nuts 13. The hose 8 is inserted between the jaws resting in the recesses 10, and a sufficient portion of the hose is drawn through the jaws so that the free end of the hose passes down well into the socket in the form shown in Fig. 1, or well over the tube 19 in the form shown in Fig. 2. The nuts 13 are then tightened on the hose to clamp it firmly between the jaws. After the hose is secured in place the nut 16 is tightened, thus forcing the free end of the hose down tightly into contact with the side of the thawing point to make a steam-tight joint. The point of the thawing-point is inserted in the frozen gravel and the point is driven into the gravel by blows on the striking head, steam meanwhile being admitted through the hose and through the opening 5 to the point of the thawing point. After the thawing is completed the clamp may be removed from the point, and the said point may be left in the gravel until dug out.

It will be noticed that the ends of the recesses forming the holder for the hose are rounded, thereby preventing injury to the hose during the driving of the point.

In Fig. 5 is shown a clamp 20 having at one end an angular portion 21 for engaging the depression 4, and at the other an elliptical opening 22 for receiving the hose. A segmental plate 23 is arranged in the outer end of the elliptical opening 22, and is provided in its outer face with a depression 24, for receiving the end of a set screw 25, threaded through a boss 26 on the end of the clamp and an opening 27 is provided for the bolt 15. In the above construction, the hose is inserted in the opening 22, and the set screw is manipulated to tighten the segmental plate thereon, whereby to clamp the hose in place. The operation of the clamp is in all respects similar to the construction shown in Figs. 1 to 4 inclusive.

In Fig. 6, the clamp 28 is provided at one end with an angular portion 29 for engaging the depression 4, and at the other with a pair of jaws 30, 31, one of which is hinged to the clamp, as at 32, and both of the jaws are provided with lugs 33 engaging each other when the clamp is closed, both of the lugs being provided with a recess, in one of which is pivoted a bolt 34 adapted to engage the recess of the other jaw, a nut 35 being provided for securing the parts together. In the above construction, the hose is inserted in the opening between the jaws 30, 31 and the nut 35 is tightened to clamp the hose in place.

It will be observed, that there are no weak parts exposed to the hard usage of underground drifts, such as the dropping of boulders from the roof, which may be anywhere from five to twenty feet high, or a misblow of the sledge used in driving, which misblows are frequent occurrences in dark and close corners of the drift. The device is also light, compact and very simple making it easily handled in drifts.

The points are generally used in batteries of from two to six points connected by hose to a steam header, the points weighing from twenty to eighty pounds, each according to length and the improved form of clamp is an especial advantage, since it is quickly and easily disconnected. In addition there are no projections from the point except in the one direction, for which reason they may be driven in close corners and angles such as are encountered in under-ground works, and when the thawing is finished it is not necessary to dig under or around the point to disconnect the hose. The hose is usually kept on top of the point in driving, and the only loose part of the device is the nut 16, the bolt being usually driven in the point-head tightly enough to retain its position.

A tight joint is absolutely necessary in this form of mining, since any escape of steam starts a slipping of rocks and gravel which is an occurrence to be carefully avoided.

I claim—

1. The combination with a thawing point provided with a driving head and having an opening leading from the point to the side of the thawing point adjacent to the head, the thawing point being provided with a tubular extension at the side opening, a bolt traversing the point adjacent to the extension, a holder comprising a pair of clamping jaws each of said jaws having spaced recesses on their adjacent faces, the recesses coöperating to form a bearing for the bolt and a holder for the hose, said last named recesses registering with the tubular extension and being corrugated on their inner faces, and bolts passing through the jaws for securing them together, the ends of the jaws remote from the tubular extension being bent at an angle and reduced, the thawing point having a depression for receiving the reduced end.

2. The combination with a thawing point provided with a transverse opening adjacent to the head, of a hose clamp and holder, said holder comprising a pair of jaws having registering recesses coöperating to form a bearing, and registering recesses having corrugated inner faces coöperating to form a holder to receive the hose, bolts traversing the jaws for securing them together, the ends of the jaws remote from the hose holder being pointed and bent at an angle to the body portion thereof, the thawing point being provided with a recess for receiving the said ends, and a bolt traversing the transverse opening and the bearing for adjustably securing the clamp to the point.

3. The combination with a thawing point provided with a transverse opening adjacent to the head and with a depression near the opening, of a hose clamp and holder comprising a pair of jaws having coöperating, recessed, corrugated faces for engaging the hose, and angular portions for entering the depression, means for adjustably securing the jaws together, and a bolt passing through the transverse opening, the clamp being provided with a bearing for receiving the bolt, and a nut on the bolt for adjusting the clamp to and from the point.

4. The combination with a thawing point, of a hose clamp and holder comprising a pair of jaws having at one end coöperating corrugated recesses for engaging the hose and at the other end angular portions, the thawing point being provided with a depression for receiving said angular portions, means for adjusting the jaws toward and from each other, and a bolt passing through the point and on which the jaws are journaled, and a nut on the bolt for adjusting the clamp to and from the point.

5. The combination with a thawing point, of a hose clamp and holder comprising a pair of jaws provided with registering recesses for receiving the hose, and with angular ends for engaging the point, the point having a depression in which the ends are received, means for securing the jaws together, and means for adjustably securing the jaws to the point.

6. The combination with a thawing point, of a hose clamp and holder, comprising a pair of jaws for engaging the hose and having angular portions for engaging the point, means for adjusting the jaws toward and from each other, and means for adjusting the jaws toward and from the point.

7. The combination with a thawing point, of a pair of jaws for engaging and clamping the hose, each of said jaws being provided with an angular portion for engaging the point, and means for adjustably securing the jaws to the point.

8. The combination with a thawing point, of hose clamping jaws, provided with a point engaging portion, and means for adjustably securing the jaws to the point.

9. The combination with a thawing point, of a hose clamp and holder provided with means for engaging the hose, and having an angular portion for engaging the point, and means for adjusting the clamp toward and from the point.

10. The combination with a thawing point, of a clamp for engaging and holding the hose, said clamp being provided with an angular portion for engaging the point, and means for adjustably securing the clamp to the point.

11. The combination with a thawing point, of a hose clamp provided with an angular portion for engaging the point, and means for adjustably securing the clamp to the point.

12. The combination with a thawing point, of hose clamping jaws provided with a point engaging portion, and means intermediate the jaws and the point engaging portion for connecting the clamp with the point.

13. The combination with a thawing point, of hose clamping jaws provided with a point engaging portion, and means in connection with the point and the jaws for drawing said jaws toward the point.

ALLEN HAMILTON HAKES.

Witnesses:
JAMES WICKERSHAM,
G. A. JEFFERY.